April 14, 1964   G. M. GROENENDYKE   3,129,404
METHODS AND APPARATUS FOR SEISMIC SECTION RECORDING
Filed June 25, 1959   3 Sheets-Sheet 1

April 14, 1964 G. M. GROENENDYKE 3,129,404
METHODS AND APPARATUS FOR SEISMIC SECTION RECORDING
Filed June 25, 1959 3 Sheets-Sheet 2

April 14, 1964   G. M. GROENENDYKE   3,129,404
METHODS AND APPARATUS FOR SEISMIC SECTION RECORDING
Filed June 25, 1959   3 Sheets-Sheet 3

United States Patent Office 3,129,404
Patented Apr. 14, 1964

3,129,404
METHODS AND APPARATUS FOR SEISMIC SECTION RECORDING
Goethe M. Groenendyke, Dallas, Tex., assignor, by mesne assignments, to Socony Mobil Oil Company, Inc., New York, N.Y., a corporation of New York
Filed June 25, 1959, Ser. No. 822,849
10 Claims. (Cl. 340—15.5)

This invention relates to the production of cross sections of the earth from seismic information and more particularly to the presentation of a cross section or seismic section as a duo-density recording and has for an object the provision of methods and apparatus for producing a simplified representation of a seismic section emphasizing major faults and other subsurface stratigraphic conditions.

Seismic sections have been produced from a plurality of seismograms each one of which is obtained by initiating an impulse, for example, the detonation of an explosive charge, and detecting waveforms at a plurality of spaced points at the earth's surface which result from the reflection from discontinuities of strata within the earth of the initial impulse. The waveforms or pulses received at the spaced points are recorded with respect to time to produce a seismogram. By assembling a plurality of seismograms taken across a given traverse of the earth and after correcting the seismograms for moveout error and weathering, the various traces comprising the seismograms are aligned on a single record which depicts a cross section of earth structure over the traverse. Each section may represent a traverse extending from several miles to several hundred miles.

The purpose, of course, of these seismic sections is to present to the viewer a summary of the stratigraphic characteristics of the earth. The desired presentation is complicated somewhat by the presence of noise signals and multiple reflections, all of which are composited with the primary seismic reflection and are represented by the seismic wave. In many instances, the character of the subsurface formations is obscured by the presence of the multiples and the noise.

In accordance with the present invention, there are provided methods and apparatus for preparing and presenting a seismic section having substantially eliminated therefrom the noise interference and many of the problems presented by multiples. More particularly and in accordance with the present invention, the seismic section is presented in the form of a duo-density representation of a seismic wave. Means are provided which respond to predetermined levels of the recorded seismic signal so as to eliminate from the reproduction, and thus from the seismic section, noise signals and other undesirable signals of low amplitude which tend to obscure primary information contained in the seismic waves. In one embodiment of the present invention, an electrical signal is generated whose amplitude varies with variations in the amplitude of a seismic wave. This electrical signal is compared with a predetermined reference level; and each time the electrical signal exceeds the reference level, a pulse is generated. The duration of the pulse corresponds with the time duration that the electrical signal exceeds the value of the reference level. This pulse is then applied to a suitable recording medium, preferably of the electrosensitive type.

The recording of the pulse is made upon an electrosensitive medium by generating a current in response to the generation of each of the pulses.

For other objects and advantages of the present invention reference may be had to the following detailed description and accompanying drawings in which:

FIG. 1 schematically illustrates a seismic section printing system embodying the present invention;

Figure 4:
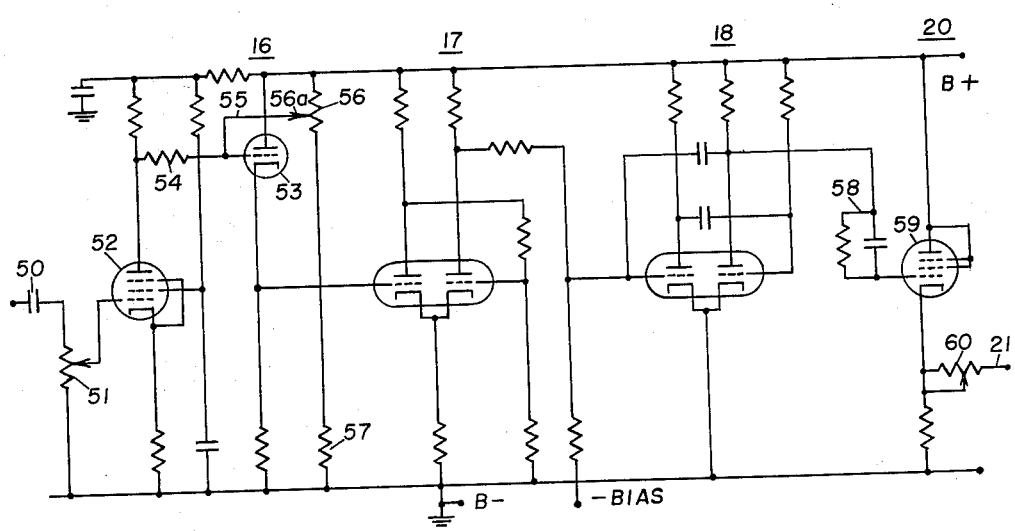
Figure 5:
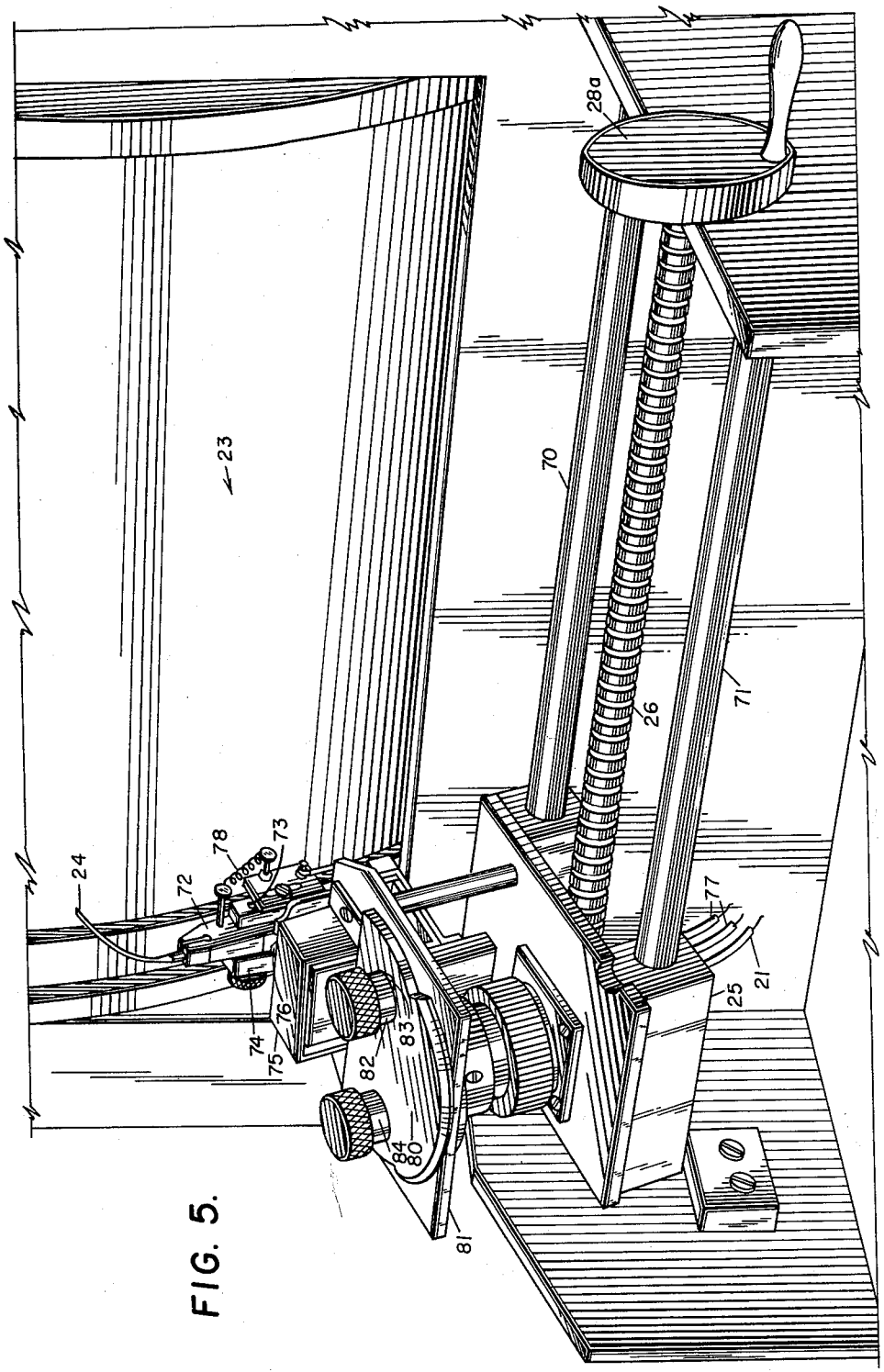

FIG. 4 schematically illustrates one circuit arrangement for carrying out the present invention; and FIG. 5 is a perspective view of apparatus suitable for recording data on an electrosensitive medium.

Figure 1:
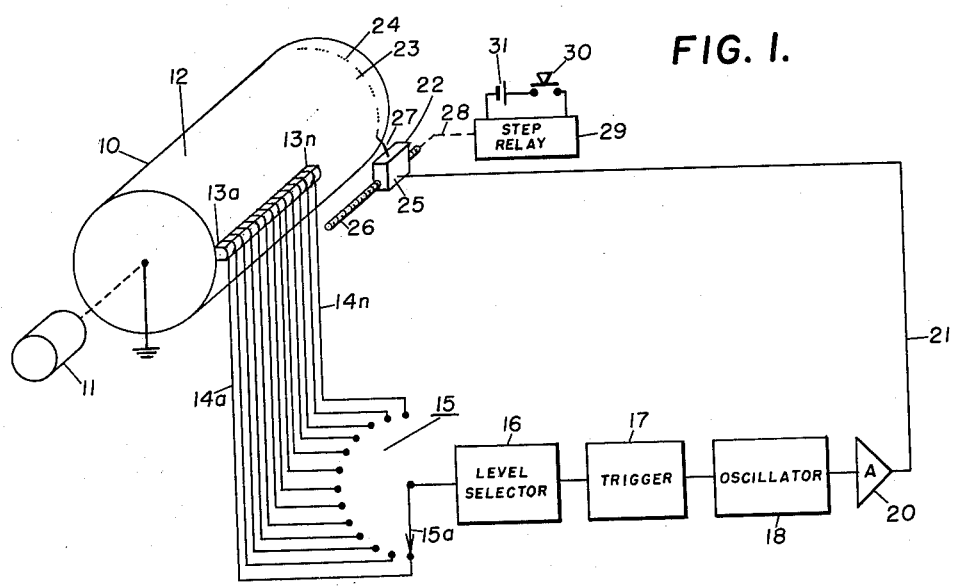

Referring now to FIG. 1, there is illustrated a system for producing a new type of visual recording of the cross section of the earth from information contained in one or more seismograms. The new record formed in accordance with the present invention depicts only major reflections or peaks to the exclusion of minor peaks which may represent multiple reflections and noise. For convenience, the record including one or more seismic traces will be referred to hereinafter as a seismic section.

The system includes a drum 10 driven at any selected speed by a motor 11. The drum and motor combination, which is available from Southwestern Industrial Electronics, Houston, Texas, has provision for mounting about the periphery thereof a seismogram 12 upon which seismic traces have previously been recorded in a phonographically reproducible manner. Preferably, the seismogram 12 is in the form of a magnetic tape upon which is recorded six or more seismic traces. In one embodiment, the magnetic tape is four and one-half inches wide and provision is made for recording twenty-four seismic traces.

The seismogram or record 12 preferably is a magnetic record which is a composite of a number of seismograms recorded along the same time base and in which dynamic and static corrections have been introduced to remove the usual timing errors due to moveout, weathering, and elevation. In addition, the seismic traces on the record may also have been subjected to filtering operations or other modifications well known in the art for the purpose of emphasizing the reflection waveforms.

The drum 10 constitutes part of a playback system which also includes a plurality of detecting heads 13a–13n. While twelve detecting heads have been illustrated, it will be understood that the number of heads will conform with the number of seismic traces present on the tape 12. One side of each of the detecting heads 13a–13n is connected to ground and the other side of each is connected by way of conductors 14a–14n to the contacts of a selector switch 15.

Assuming initially that the information on the tape 12 is in the form of amplitude-modulated waves, the movable contact 15a of selector switch 15 is moved to a first position and the drum 10 rotated to produce electrical signals from the detecting head 13a which are applied by way of conductor 14a and channel selector switch 15 to level selector 16. The level selector 16 provides a means for selecting the level which the seismic pulses must exceed in order to be visually recorded as a portion of the record section. The output of the level selector 16 is fed to a triggering means or pulse generator 17 which is normally biased to respond to signals attaining a predetermined level and to maintain its output substantially constant during the time duration of the signal.

An oscillator 18 responds to the output signal of the trigger circuit or triggering means 17 to produce a series of short duration pulses for the time duration of the trigger output signal. The oscillator is of fixed frequency. The frequency may be of any desired value, preferably of a frequency adequate to produce a dark segment for the record. Frequencies in the range of 2,000 cycles per second to 4,000 cycles per second have been found satisfactory. The pulses are then amplified by the amplifier 20 and applied by way of conductor 21 to a recording means 22 for the recording on an electrosensitive medium 23 of distinct marks 24 along a time scale corresponding with the time scale of the original seismic wave.

Providing the record section on the electrosensitive medium 23 with the same time scale as the original seismogram is readily accomplished by mounting the electrosensitive medium 23 on the same drum as the seismogram or on a second drum mechanically coupled to the first drum 10 and driven at the same rate of speed. Because of the relatively high frequency of the pulses, the marks 24 will appear as a solid line whose length is a function of the duration of the pulse being recorded. Each of the marks 24 will be of uniform density and accordingly the final record will be in the nature of a series of dark markings against a neutral background. This two-tone or duo-density record when combined with similar recordings presents a new tool in the hands of seismologists for readily interpreting changes in the lithography of that portion of the earth under study. As contrasted with other seismic sections, the duo-density section produced in accordance with the present invention removes minor events and thus emphasizes the major events pointing out readily the presence of major faults such as the one present in FIG. 3 wherein a discontinuity is readily apparent at point 33 of the record section 32.

A further advantage resides in the fact that the production of the record section is at all times visible to the operator. Thus, if for any reason an error has occurred in the dynamic or static corrections, such error will be readily observed and a correction made before continuing with the production of the entire seismic section. For example, the operator upon recognizing an error may make his correction on the same sheet of electrosensitive paper and later cut out the error portion, replacing it with a corrected portion. A suitable type of electrosensitive paper is commercially available from the Alfax Paper & Engineering Company, Westboro, Massachusetts, under the trade name "Alfax Paper."

The recording is produced on the paper in the following manner. Electrosensitive paper comprises a conductive layer covered with a very thin chemically treated paper. The paper surface is engaged by a stylus 27 mounted on a carriage 25. Each time a pulse is applied to the conductor 21 and thence to the stylus 27, an arc forms between the tip of the stylus 27 and the conductive backing of the electrosensitive medium 23 to burn away the paper at one point to expose the conductive surface and thus provide a distinctive mark.

Figure 3:
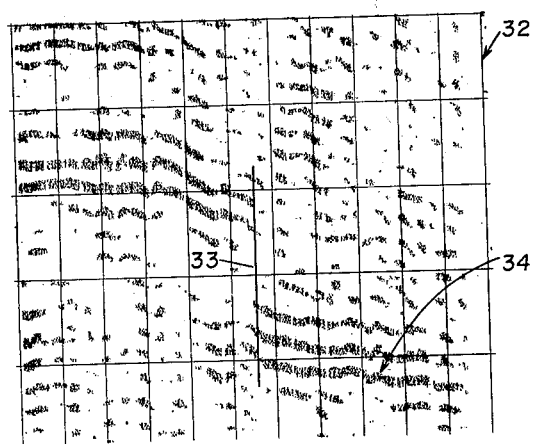
FIG. 3 is the same seismic section as FIG. 2 made in accordance with the present invention.

A plurality of these marks when grouped together present, as shown in FIG. 3, a solid vertical dash or line representing the upper and lower boundaries of a reflecting horizon and when taken together with similar lines of other seismic traces will form a continuous boundary 34 depicting the character and extent of a reflecting horizon.

When upon reviewing the recording of any one of the seismic traces the operator is satisfied with its character, that is, is convinced that the proper corrections both dynamic and static have been introduced, then he may continue with the recording of the second seismic trace to complete the entire seismic section 32 and in the following manner. After the drum 10 has made one rotation in the recording of the first seismic trace, the movable contact 15a is moved clockwise to a second position and the carriage 25 is moved along the screw 26 to position the stylus 27 for the recording of a second trace on the electrosensitive medium 23. The movement of the carriage 25 is, in the present embodiment, effected by rotating the threaded shaft 26 which is coupled by way of coupling means 28 to a step relay 29. The step relay 29 is energized by closing switch 30 for current flow from battery 31.

Figure 2:
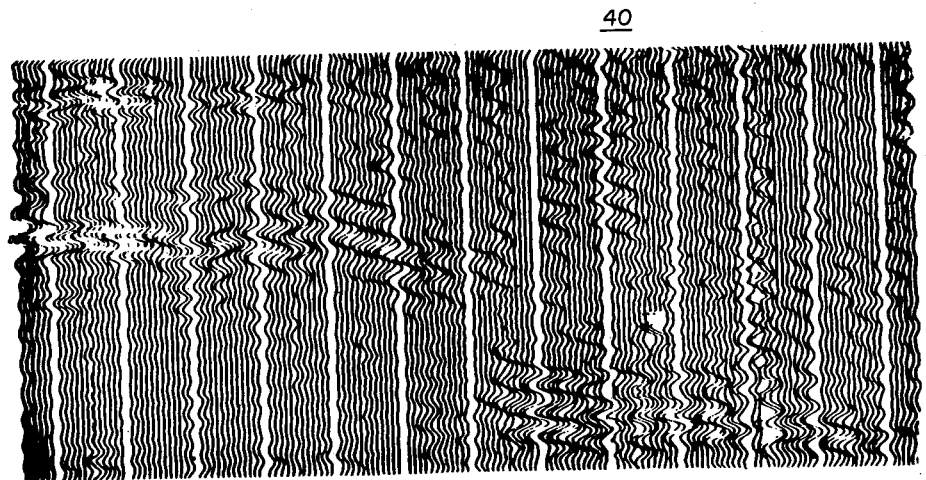
FIG. 2 is a portion of a seismic section in which the seismic traces appear as amplitude-modulated waves.

A comparison between the seismic section 40 of FIG. 2 made in accordance with prior art instrumentation and methods and the seismic section of FIG. 3 made in accordance with the present invention immediately evidences the fact that the presentation of a seismic section may be greatly simplified and that while some information is omitted in the simplification yet the advantage of being able to immediately discern major faults and other stratigraphic characteristics renders the present invention an important tool in the hands of the seismologist. The seismic section 40 of FIG. 2 is comprised of a plurality of amplitude-modulated seismic traces. As a matter of convenience in the preparation of the section 40, each of the traces are combined into groups of twelve traces each; that being normally the number of traces recorded in the field on a phonographically reproducible medium such as magnetic tape. The seismic section contains an abundance of information; much of it most valuable in a complete interpretation of the earth underlying the shooting traverse. However, much time can be and is spent in trying to resolve the rather complex configurations set forth by the section 40. Much less time is spent with a simplified arrangement of FIG. 3, for there the major fault 33 immediately is discernible and this in turn provides an identification which may be referred back to section 40 for a more complete study by the seismologist or geophysicist. Therefore, in addition to providing a constant monitoring of the seismic section as it is being produced, the present invention also makes more readily discernible the presence of discontinuities, such as faults and other physical properties of the earth.

Figure 2A:
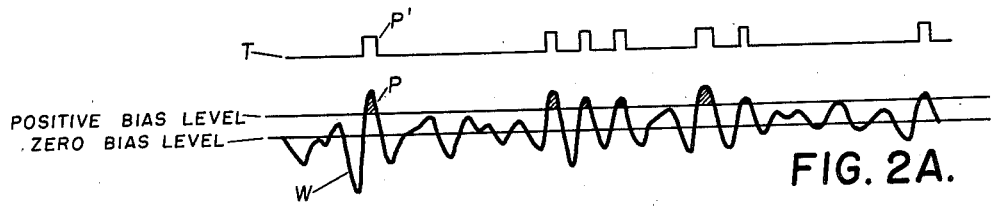
FIG. 2A is a schematic representation of waveforms helpful in the understanding of the present invention.

Referring now to FIG. 4, there is illustrated one form of circuit for producing the pulses employed in preparing the duo-density seismic section on the recording medium 23. The circuit of FIG. 4 is intended for use with an amplitude-modulated input signal of the type illustrated in FIG. 2A and identified as waveform W. It will be understood that where frequency-modulated signals are recorded in the field some suitable form of converter will be employed to produce amplitude-modulated signals for use in the preparation of the duo-density seismic section.

Assuming now that an amplitude-modulated signal is available and is representative of information to be visually displayed, such signal is applied by way of capacitor 50 and potentiometer 51 to the input of an amplifier stage 52.

The output of the amplifier 52 is applied by way of the level selector 16 to the input of the trigger circuit 17. The trigger circuit 17, preferably of the Schmitt trigger type, responds to the signals modified by the level selector 16 to produce an output signal whose duration is proportional to the time that the magnitude of the modified input signal is above a predetermined level. A complete description of the Schmitt trigger circuit may by had by referring to Time Bases, by O. S. Puckle, second edition, published by John Wiley & Sons, Inc., New York, beginning at page 81. Briefly, the Schmitt trigger circuit is of the flip-flop type responsive to signals of a predetermined magnitude to trigger in one direction. When the magnitude of the input signal falls below this predetermined or critical value, the circuit triggers in the other direction. Therefore, the trigger circuit 17 will have an output signal of square waves represented by pulse P' of waveform W. The duration of pulse P' is proportional to the time period that the pulse P of the input signal or waveform W is above a predetermined reference level; here shown as the positive bias level. Therefore, it is possible to eliminate from the record or seismic section all signals on the seismogram the magnitude of which falls below the predetermined level. Therefore, a Schmitt trigger circuit may be designed to respond to a certain critical voltage; and if it should be desired to vary the critical voltage or bias, the design of the trigger circuit may be varied. Another way of varying the critical voltage or the point at which the trigger will respond is illustrated in FIG. 4 and is represented by the level selector 16. In this arrangement, the Schmitt trigger circuit is designed to respond to an input signal whose magnitude will be attained by only a few of the peaks or pulses contained on the seismogram trace. Thus, if the unmodified signal is applied directly to the trigger circuit, only the events of large magnitude will be ultimately displayed on the seismic section. Now if a D.C. signal or reference signal is added to the trace voltage and the trace signal or voltage is thus raised to a higher average value, it will be possible selectively to record any desired number of the pulses. This range may extend from recording the entire seismogram to recording as little as desired. Specifically, the input selector comprises a cathode-follower stage 53 having its input grid circuit connected by way of resistor 54 to the plate of stage 52. The grid circuit of the stage 53 is also connected by way of conductor 55 to the movable contact 56a of a potentiometer 56. The potentiometer 56 is connected at one end to the B+ bus and at the other end connected by way of resistor 57 to the B— bus. The cathode of the stage 53 is connected to the input grid of the trigger circuit 17.

The character of the signal to be displayed or otherwise recorded is controlled by adjusting the contact 56a which varies the D.C. bias applied to the cathode-follower stage 53. For a maximum amount of information to be recorded, the contact 56a would be moved to the top of the slide wire 56; and on the other hand, for a minimum amount of information, the contact 56a would be moved to the bottom of the slide wire 56.

The output from the trigger circuit is applied to the oscillator 18 which is of the free-running multivibrator type and well-known in the art. The oscillator is normally biased at cutoff by application of a negative biasing voltage derived from a suitable supply connected to the terminal denoted by "—bias." The oscillator is of fixed frequency and is responsive to signals from the trigger circuit which exceed the level of the negative bias to produce a train of pulses employed to produce the characteristic markings 24 on the record 23, FIG. 1.

The output of oscillator 18 is applied by way of coupling network 58 to the input of the amplifier stage 20, more particularly, to the grid circuit of tube 59 shown as a pentode connected for triode operation. The stage 20 operates as an impedance matching device coupling the high output impedance of the oscillator to the low input impedance of the recording instrument. More particularly, the stage 20 is a cathode follower including a level control 60 in its cathode output circuit. Output signals from the stage 20 are applied by way of conductor 21 to the recorder.

It is evident that the method performed by the apparatus specifically described above and illustrated in FIG. 4 may be carried out by other apparatus and that the assembly and design of such apparatus will be well within the ability of those skilled in the art. It is also evident that the method may be carried out by hand operations. For example, referring once more to FIG. 2A, an operator may individually examine each of the seismic waveforms such as represented by the waveform W and determine the information contained therein to be employed for the formulation of the duo-density seismic section. For example, the bias level may be adjusted from zero to the illustrated positive bias level by drawing a horizontal line. Thus all positive-going excursions of the seismic wave W exceeding the horizontal line or positive bias level will be employed in formulating the seismic section. Thus, the pulse P and all other pulses extending above the positive bias level and further identified by shaded portions will be so employed. For each of the pulses, there will be drawn a corresponding square wave, for example, the square wave P′ for the pulse P, the former having a duration corresponding with time duration that the pulse P exceeds the positive bias level. These square waves may then be hand-colored or otherwise darkened; and when traces so formed are placed adjacent one another, they will comprise the duo-density recording similar to that illustrated in FIG. 3.

The writing stylus 27, which in one embodiment is of Phosphor bronze and has a writing width of 1/16 inch, is mounted on a block 72, pivotally mounted by way of shaft or pivot 73 to a bifurcated supporting member 74.

The stylus 24 is rotated about pivot 73 toward and away from the surface of the electrosensitive paper by means of a relay 75. With the relay 75 in a de-energized condition, armature 76 of the relay is forced against the lower end of the supporting block 72 to pivot the stylus 27 away from the paper 23. When the relay is energized, the armature 76 moves away from the lower end of the supporting block 72 and a spring 78 urges the stylus 27 into engagement with the paper 23 by moving the supporting block about pivot 73. The relay 75 is energized at the discretion of the operator by means of a circuit comprising conductors 77 connected to a suitable source of power (not shown).

The supporting block 72 and the relay 75 are both mounted to a plate 80 which is made movable relative to a supporting plate 81 to permit adjustment of the tip of the stylus 24 so that the tip may be at all times perpendicular with the surface of the recording paper 23. The adjustment of the plate 80 and hence the adjustment of the position of the stylus 24 is effected by way of a cam 82 which engages a cam-follower portion 83 in the plate 80. The cam 82 is an eccentric shaft so that rotation thereof will cause the plate 80 to rotate about the pivot 84.

Now that the principles of the invention have been explained and preferred embodiments thereof fully described, it will be understood that modifications are contemplated within the scope of the appended claims.

I claim:

1. The method of producing a duo-density recording of a seismic wave whose noise component is attenuated, comprising the steps of generating along a time base a first signal whose amplitude varies with variation in the amplitude of said seismic wave, establishing a reference level whose amplitude is related to the noise component, comparing the amplitude of said first signal with said reference level, and recording along said time base a mark of distinctive character each time said first signal exceeds said reference level and of a length corresponding with the duration that the first signal exceeds said reference level along said time base.

2. The method of producing a duo-density recording of a seismic wave whose noise component is attenuated, comprising the steps of generating along a time base a wave train signal corresponding with said seismic wave, establishing a reference level whose amplitude is related to the noise component, producing a signal of square waves having alternate levels whose duration corresponds with the duration of time said wave train signal is above or below said reference level, and recording marks of distinctive character representative of the time duration of alternate ones of said square waves on a recording medium and along a time base related to said first-named time base.

3. The method of claim 1 in which each distinctive mark extending along the time base is comprised of a plurality of substantially evenly spaced lines of short duration whose length extends in direction transverse to said time base.

4. Apparatus for producing a duo-density recording of a seismic wave comprising means for generating with respect to a first time base an electrical signal whose amplitude varies with variations in the amplitude of said seismic wave, means for generating a reference level, means for generating a pulse each time said electrical signal exceeds said reference level and of a time duration corresponding with the time duration of the electrical signal exceeding said reference level, and means responsive to said pulse for recording along a second time base related to said first time base a visual mark of distinctive character having a length along said second time base corresponding with the time duration of said pulse.

5. Apparatus for producing a duo-density recording of a seismic wave comprising means for generating along a first time base an electrical wave train signal corresponding with said seismic wave, means for generating as a reference level an electrical signal, means for generating a square wave electrical output signal having alternate levels corresponding with the duration of time during which said electrical wave train is above or below said reference level, and means responsive to those square waves representative of those portions of the wave train exceeding the reference level for recording along a second time base related to said first time base lines comprised of marks of distinctive character extending along said second time base and of length corresponding with the duration of said last-named square waves.

6. Apparatus for producing a duo-density recording of a seismic wave comprising means for generating with respect to a first time base an electrical signal whose amplitude varies with variations in the amplitude of said seismic wave, means for generating a reference level, means for generating a pulse each time said electrical signal exceeds said reference level and of a time duration corresponding with the time duration of the electrical signal exceeding said reference level, a recording device including an electro-sensitive recording medium, means responsive to said pulse for exciting said recording device for the production on the medium and along a second time base related to said first time base a visual mark of distinctive character having a length along said second time base corresponding with the time duration of said pulse.

7. Apparatus for producing a duo-density recording of a seismic wave comprising means for generating along a first time base an electrical wave train signal corresponding with said seismic wave, means for generating as a reference level an electrical signal, means for generating a square wave electrical output signal having alternate levels whose duration corresponds with the duration of time during which said electrical wave train is above or below said reference level, means responsive to those square waves representative of those portions of the wave train exceeding the reference level for generating at a high frequency rate a series of pulses, and means responsive to said pulses for recording said pulses along a second time base related to said first time base.

8. Apparatus for producing a duo-density representation of selected portions of a seismic wave having a time scale, comprising means for generating an electrical wave train signal representative of said seismic wave, means for transmitting only those portions of said signal exceeding a predetermined magnitude, means responsive to said transmitted signals for generating square waves each of which corresponds in duration to the duration of its respective transmitted signal, means responsive to said square waves for generating high frequency pulses, and means for recording said pulses along a time scale corresponding with the time scale of said seismic wave.

9. Apparatus for producing a duo-density representation of selected portions of a seismic wave having a time scale, comprising means for generating an electrical wave train signal representative of said seismic wave, a square wave generator, a biasing circuit for conditioning said generator for response only to signals whose magnitude exceeds a level determined by said biasing circuit to permit production by said generator of square waves each of which corresponds in duration to the time duration said signals exceed said level, means responsive to said square waves for generating high frequency pulses, and means for recording said pulses along a time scale corresponding with the time scale of said seismic wave.

10. Apparatus for producing a duo-density representation of selected portions of a seismic wave having a time scale, comprising means for generating an electrical wave train signal representative of said seismic wave, a square wave generator, a biasing circuit for conditioning said generator for response only to signals whose magnitude exceeds a level determined by said biasing circuit to permit production by said generator of square waves each of which corresponds in duration to the time duration said signals exceed said level, an oscillator, means for biasing said oscillator to cut off, said oscillator being responsive to said square waves exceeding a level determined by said biasing means to generate high frequency pulses, and means for recording said pulses along a time scale corresponding with the time scale of said seismic wave.

References Cited in the file of this patent

UNITED STATES PATENTS

| | | |
|---|---|---|
| 2,651,963 | Bischoff | Sept. 15, 1953 |
| 2,791,288 | Meier | May 7, 1957 |
| 2,877,080 | Eisler | Mar. 10, 1959 |
| 2,890,091 | Curtis | June 9, 1959 |
| 2,941,184 | Moody | June 14, 1960 |
| 2,968,022 | Unterberger | Jan. 10, 1961 |